(12) United States Patent
Kadoya

(10) Patent No.: US 12,319,287 B2
(45) Date of Patent: Jun. 3, 2025

(54) TRAVEL CONTROL APPARATUS

(71) Applicant: SUBARU CORPORATION, Tokyo (JP)

(72) Inventor: Yuki Kadoya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/926,805

(22) PCT Filed: Aug. 31, 2021

(86) PCT No.: PCT/JP2021/031934
§ 371 (c)(1),
(2) Date: Nov. 21, 2022

(87) PCT Pub. No.: WO2023/032035
PCT Pub. Date: Mar. 9, 2023

(65) Prior Publication Data
US 2024/0227802 A1 Jul. 11, 2024

(51) Int. Cl.
*B60W 30/00* (2006.01)
*B60W 30/165* (2020.01)
(52) U.S. Cl.
CPC ..... *B60W 30/165* (2013.01); *B60W 2520/105* (2013.01); *B60W 2554/4041* (2020.02);
(Continued)
(58) Field of Classification Search
CPC ......... B60W 30/165; B60W 2520/105; B60W 2554/4041; B60W 2554/4045;
(Continued)

(56) References Cited

U.S. PATENT DOCUMENTS

2017/0154527 A1* 6/2017 Yoshitomi .......... G08G 1/09623
2019/0225219 A1* 7/2019 Ueda ................... B60W 30/165
(Continued)

FOREIGN PATENT DOCUMENTS

JP 2009-110343 A 5/2009
JP 2009-126433 A 6/2009
(Continued)

OTHER PUBLICATIONS

Amir Badshah, Naveed Islam, Danish Shahzad, Bilal Jan, Haleem Farman, Murad Khan, Gwanggil Jeon, Awais Ahmad, Vehicle navigation in GPS denied environment for smart cities using vision sensors, Computers, Environment and Urban Systems, 2019 (Year: 2019).*

*Primary Examiner* — Russell Frejd
*Assistant Examiner* — Brittany Renee Peko
(74) *Attorney, Agent, or Firm* — TROUTMAN PEPPER LOCKE LLP

(57) ABSTRACT

A travel control apparatus to be mounted on a vehicle includes a computer device configured to perform control to cause the vehicle to travel at a set constant vehicle speed or to cause the vehicle to travel following the preceding vehicle. The computer device includes a determination unit and a target acceleration rate setting unit. The determination unit is configured to, before turn steering is started, determine whether it is a turn opportunity for the vehicle to make a first direction turn. The first direction turn is a turn made by the vehicle deviating from a current travel course without crossing an oncoming travel course. The target acceleration rate setting unit is configured to, in a case where the determination unit determines that it is the turn opportunity, perform control to reduce acceleration before the turn steering is started.

3 Claims, 11 Drawing Sheets

(52) U.S. Cl.
CPC . *B60W 2554/4045* (2020.02); *B60W 2556/40* (2020.02); *B60W 2720/10* (2013.01); *B60W 2720/106* (2013.01); *B60W 2754/30* (2020.02)

(58) Field of Classification Search
CPC ......... B60W 2556/40; B60W 2720/10; B60W 2720/106; B60W 2754/30
See application file for complete search history.

(56) References Cited

U.S. PATENT DOCUMENTS

| | | | |
|---|---|---|---|
| 2021/0046935 A1 | 2/2021 | Mizoguchi | |
| 2021/0064030 A1* | 3/2021 | Jiang | G05D 1/0088 |
| 2021/0380108 A1* | 12/2021 | Iihoshi | B60W 30/16 |
| 2022/0340123 A1* | 10/2022 | Kameoka | B60W 30/02 |
| 2023/0037006 A1* | 2/2023 | Quint | G01C 21/3617 |

FOREIGN PATENT DOCUMENTS

| | | | | |
|---|---|---|---|---|
| JP | 2015-78636 A | | 4/2015 | |
| JP | 2015-229405 A | | 12/2015 | |
| JP | 2019147526 A | * | 9/2019 | ............ B60W 10/00 |
| JP | 2021-30740 A | | 3/2021 | |

* cited by examiner

[ FIG. 1 ]
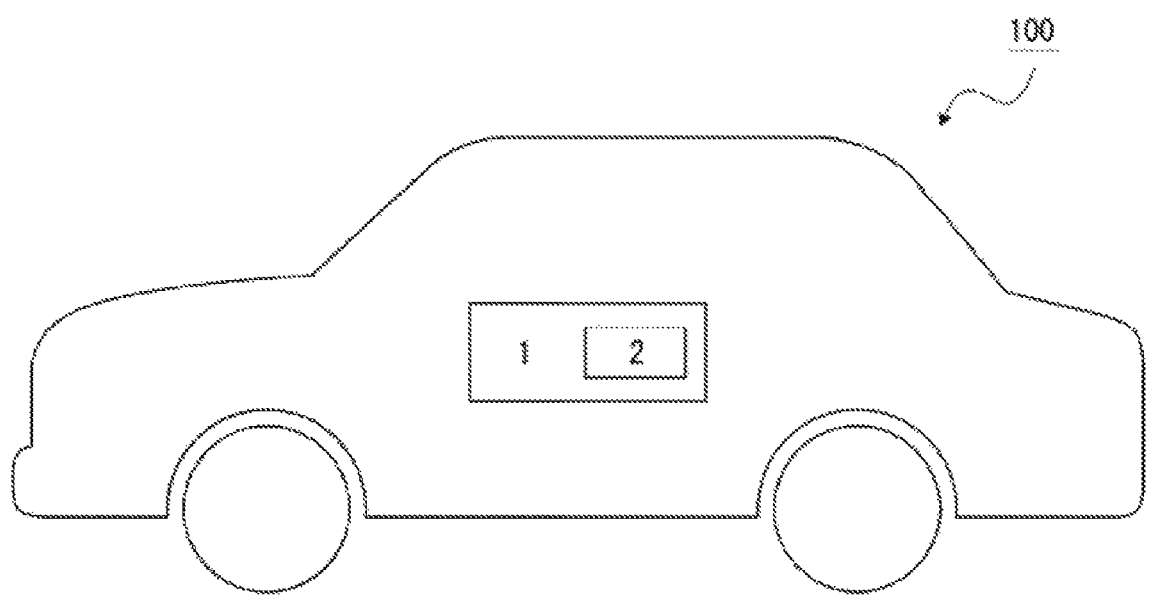

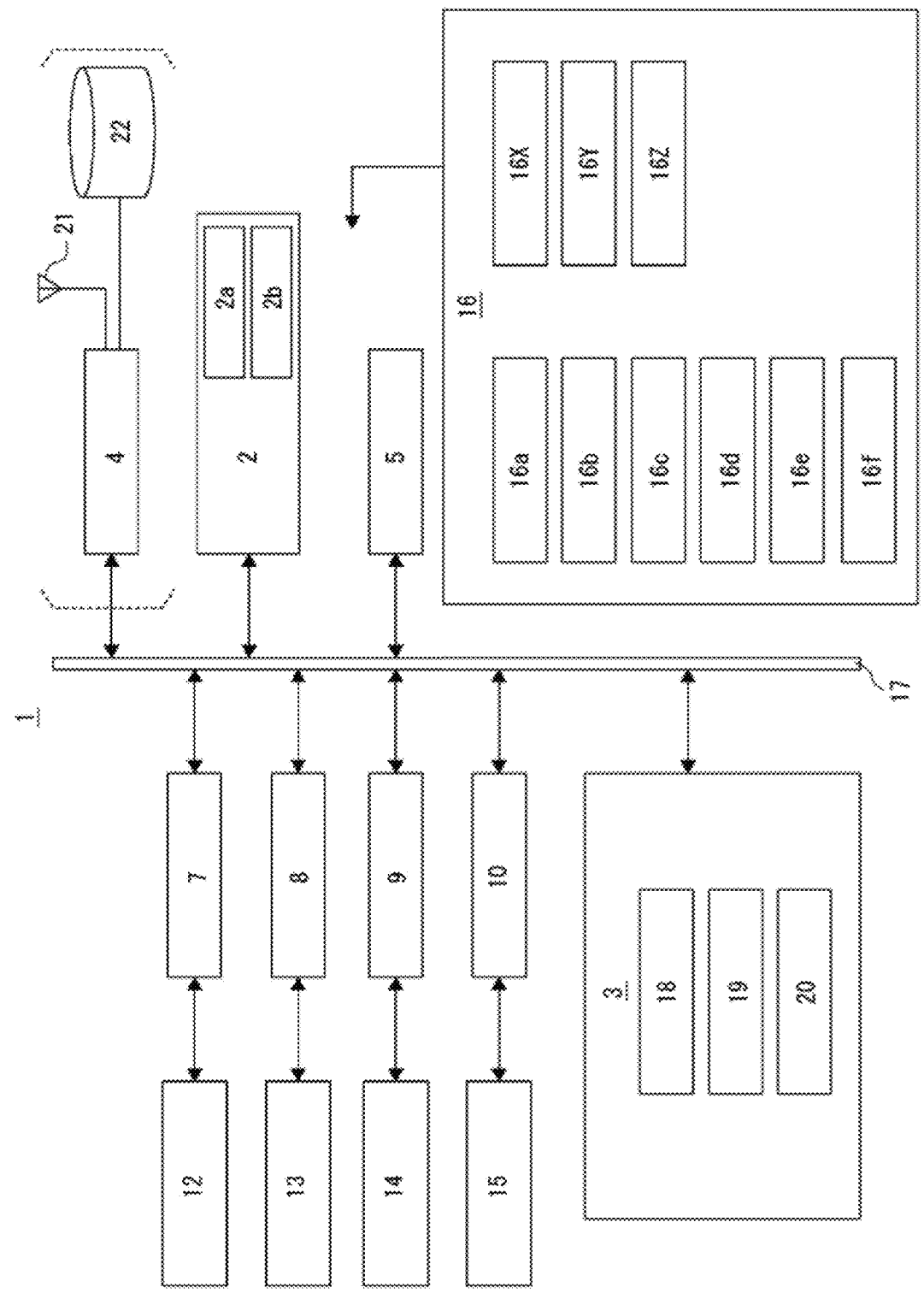
[FIG. 2]

[ FIG. 3 ]
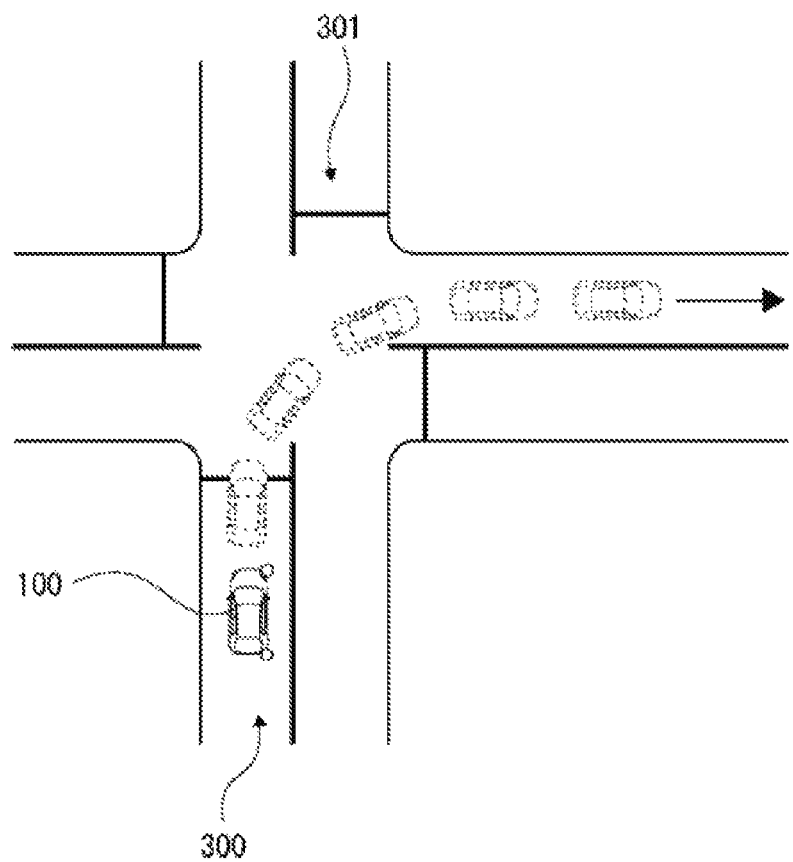
[ FIG. 4 ]
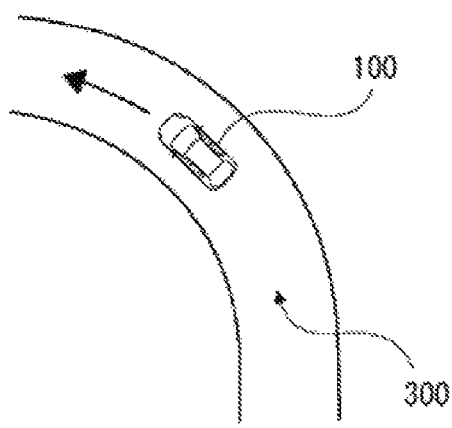

[ FIG. 5 ]
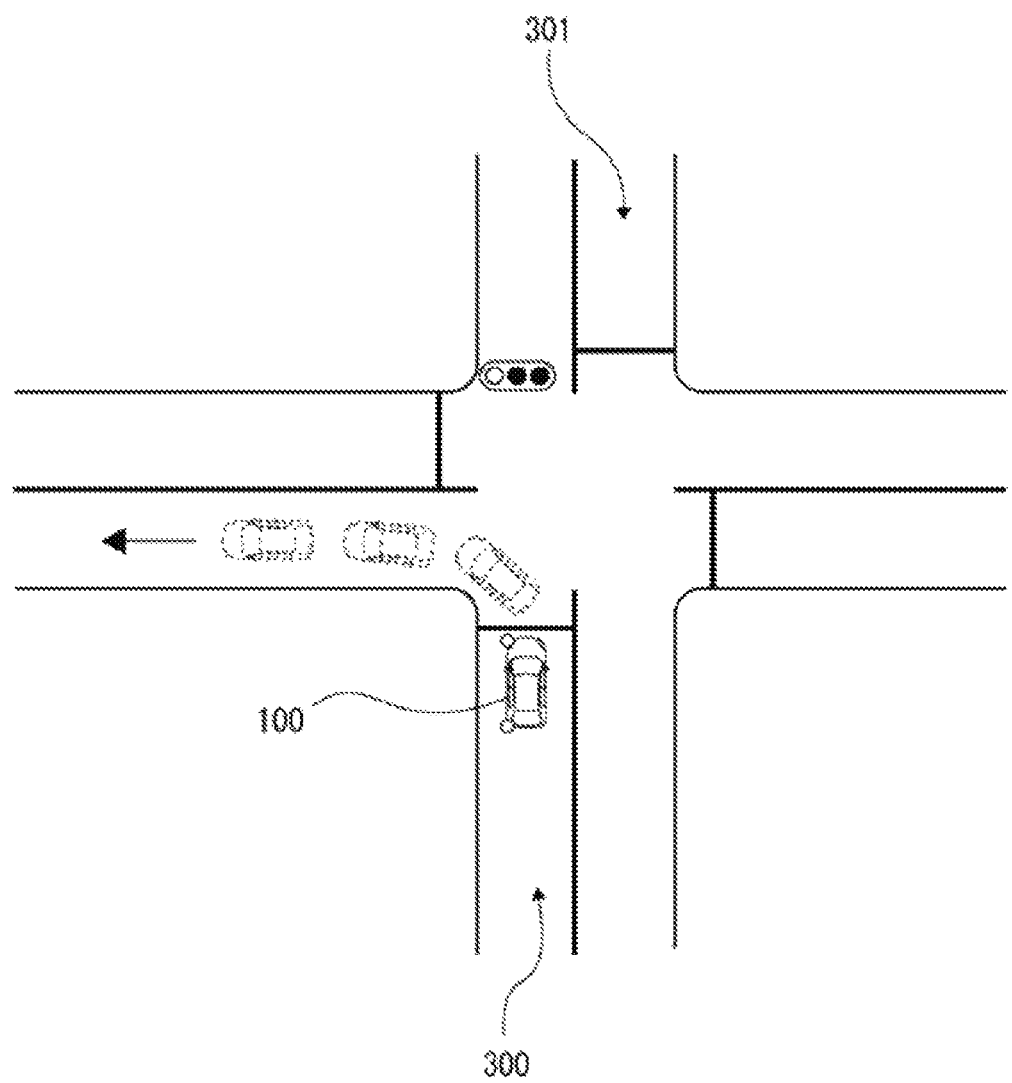

[FIG. 6]
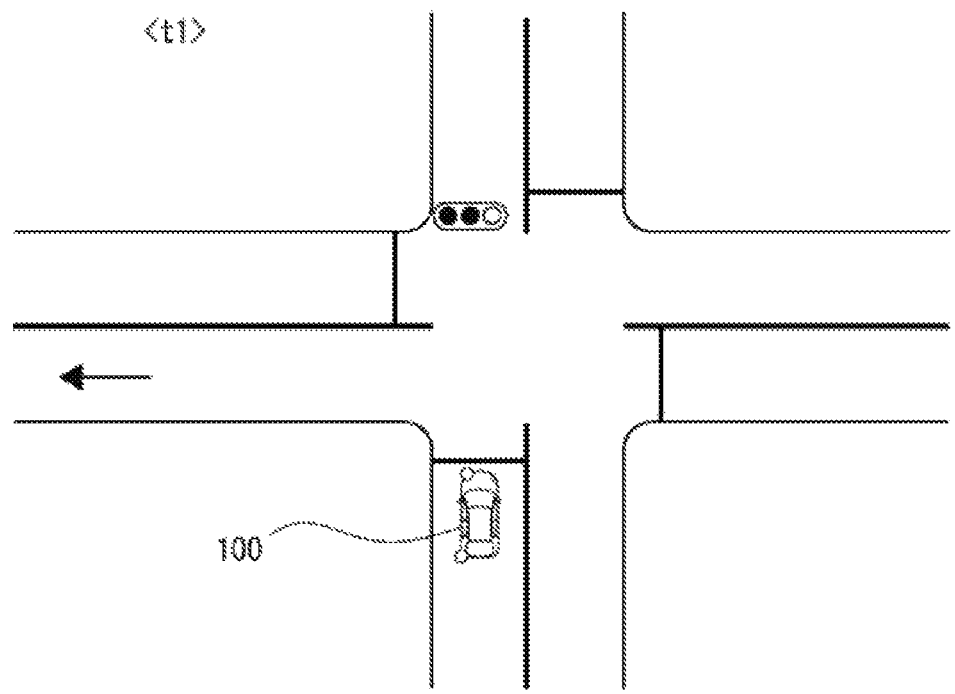
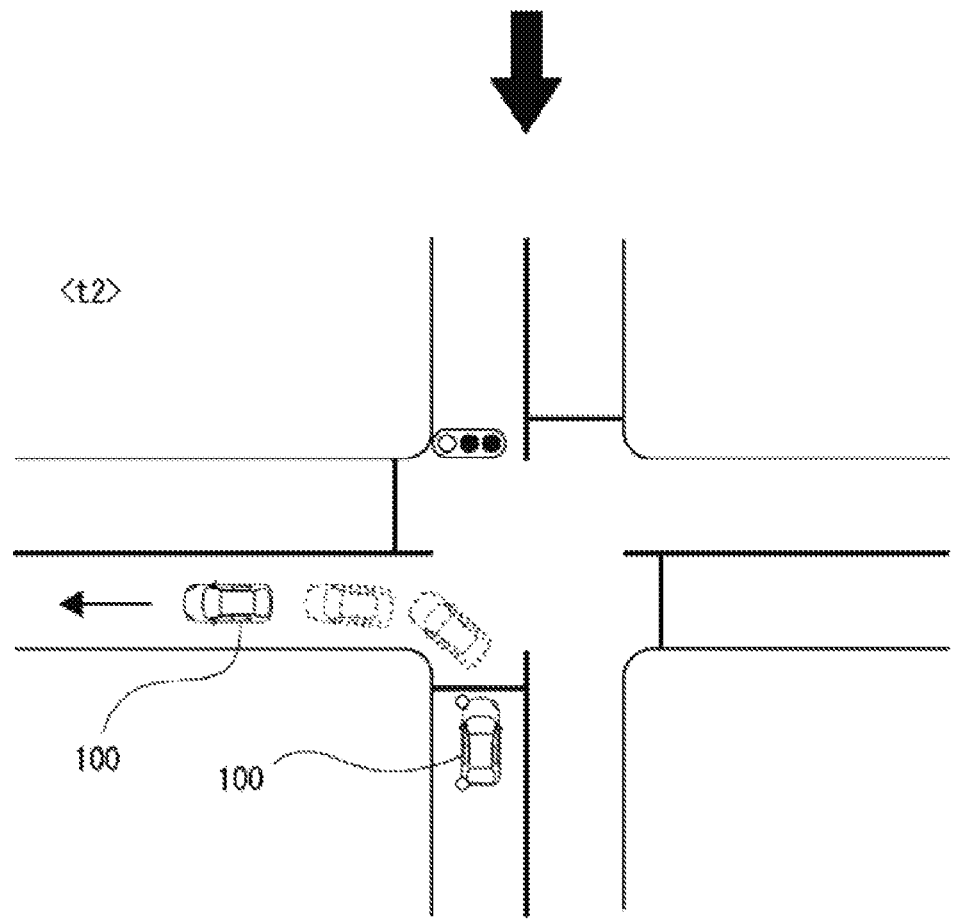

[FIG. 7]
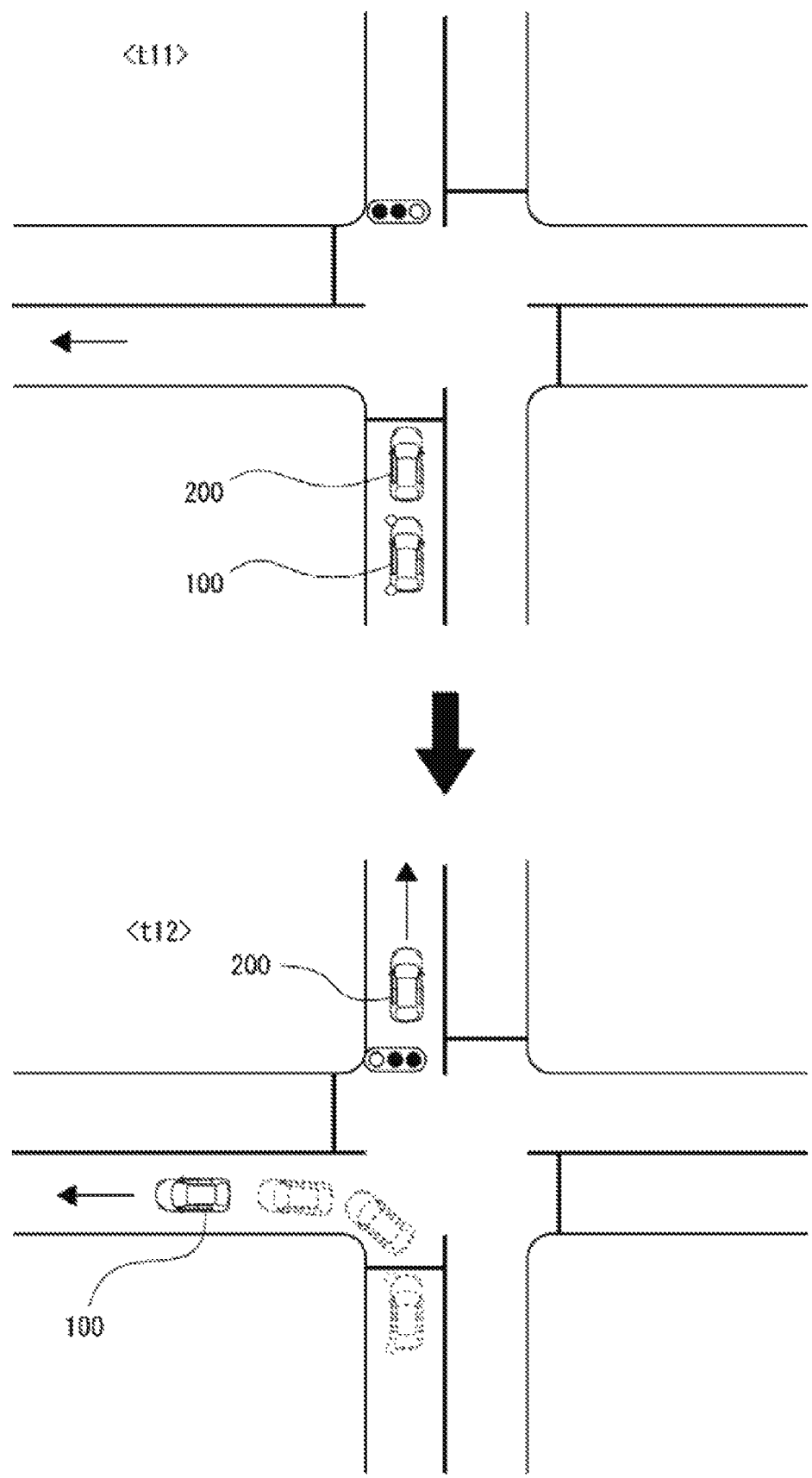

[ FIG. 8 ]
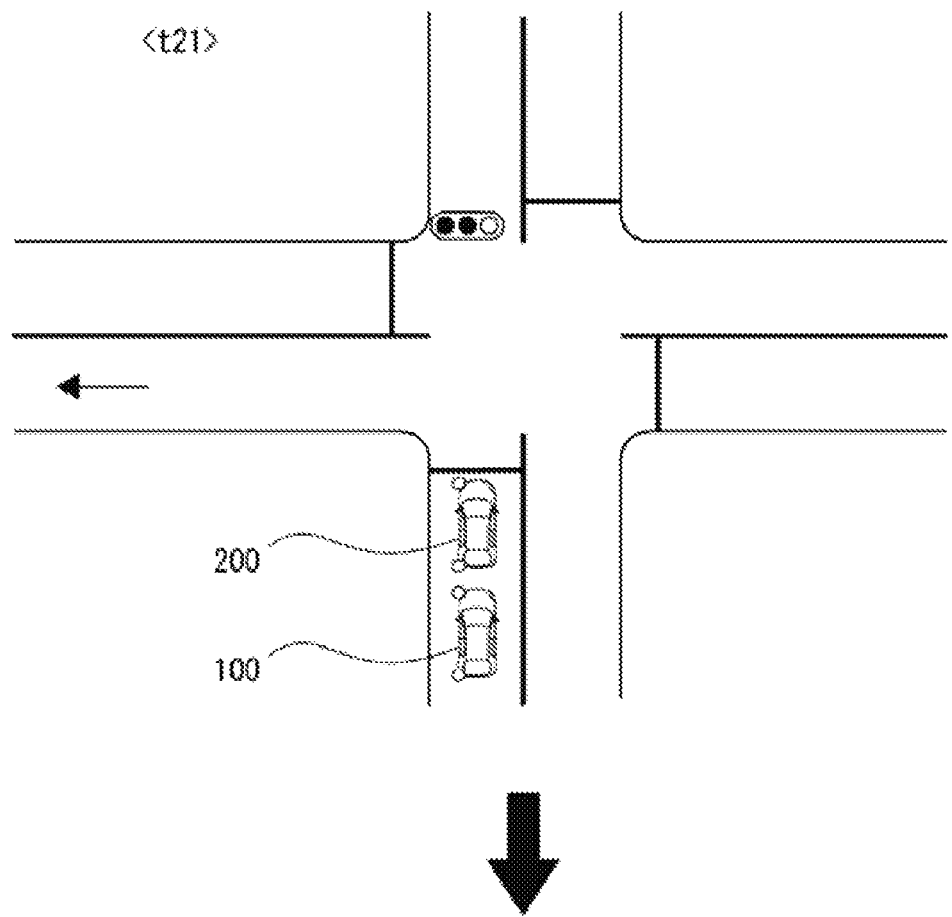

[FIG. 9]
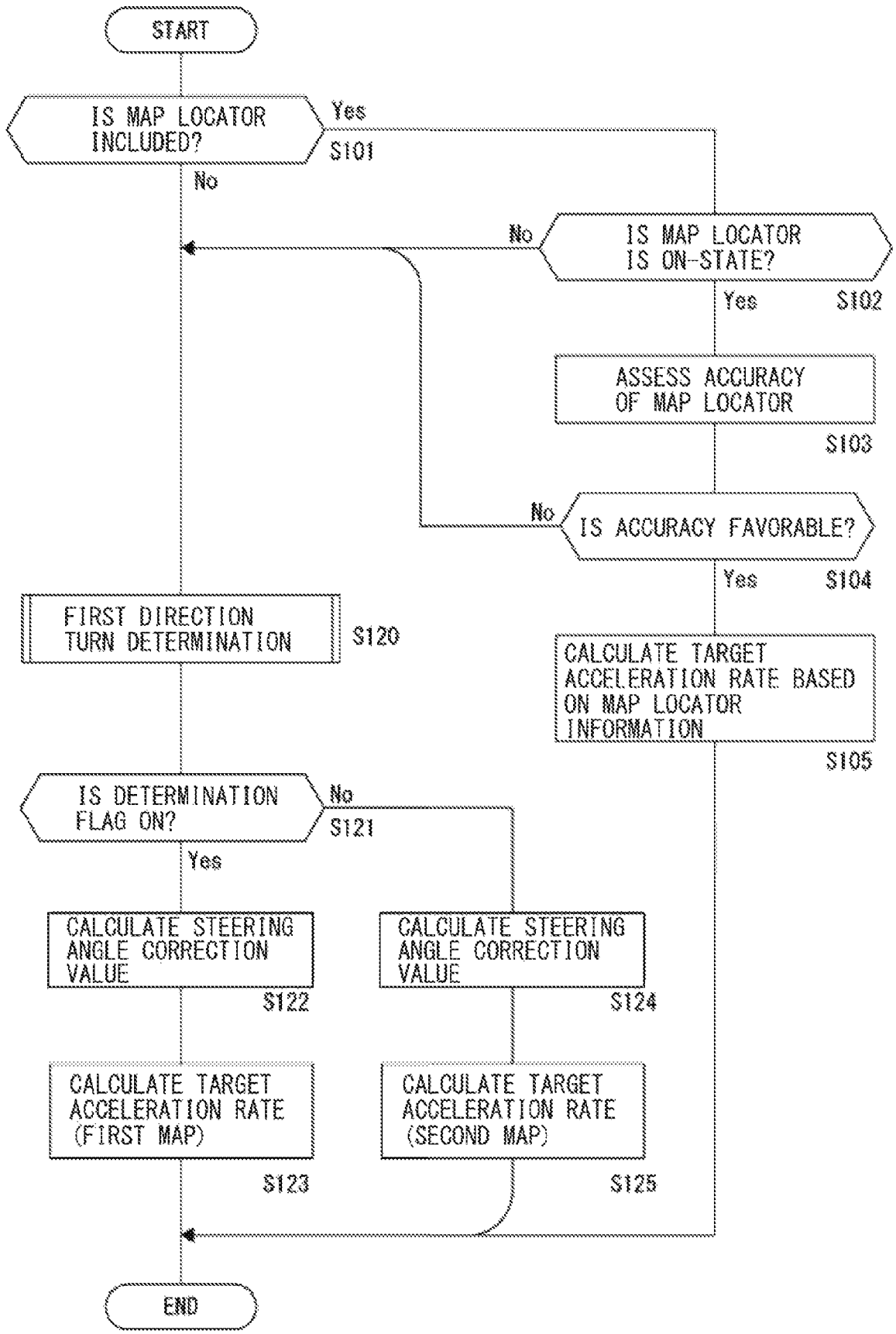

[FIG. 10]
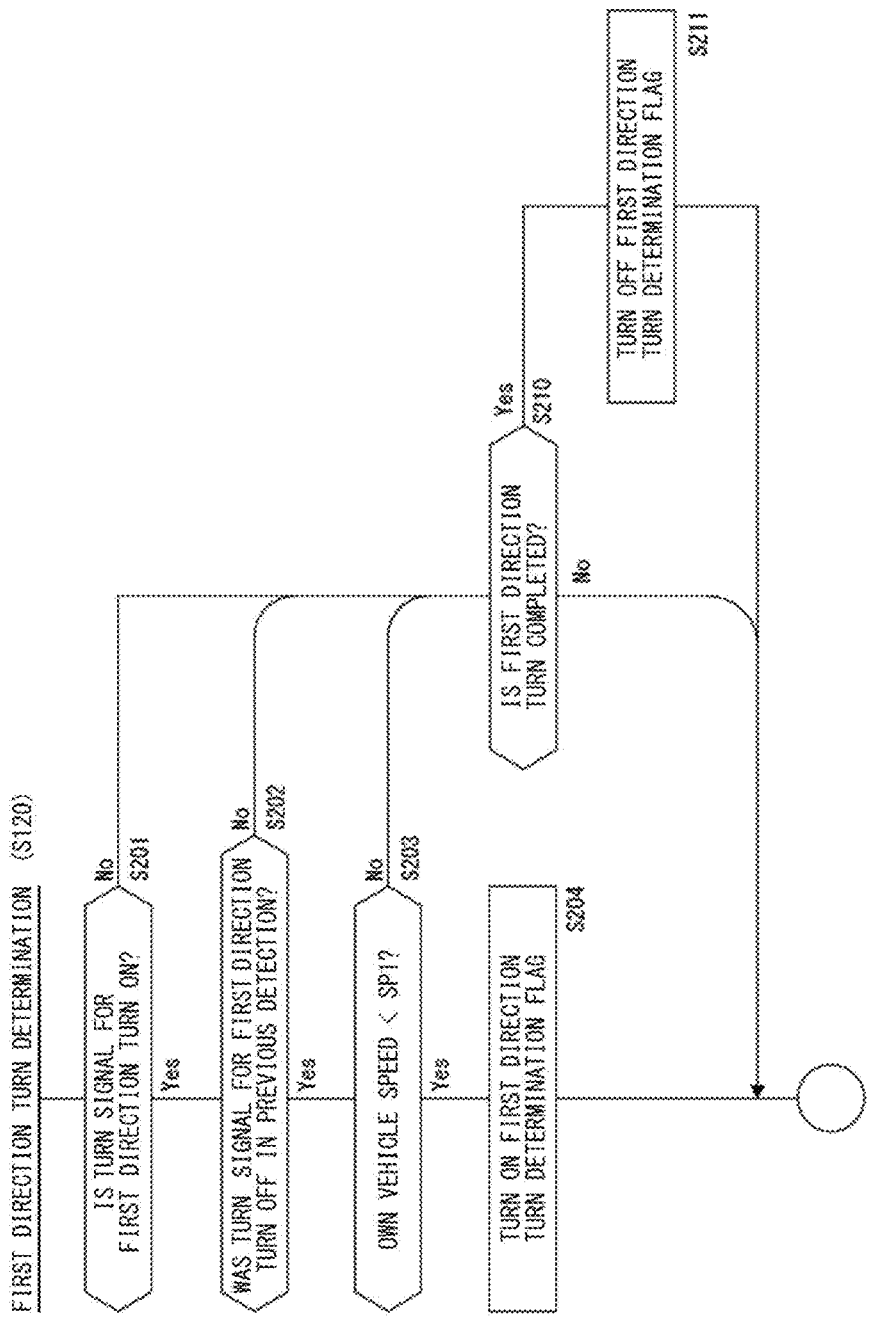

[ FIG. 11 ]
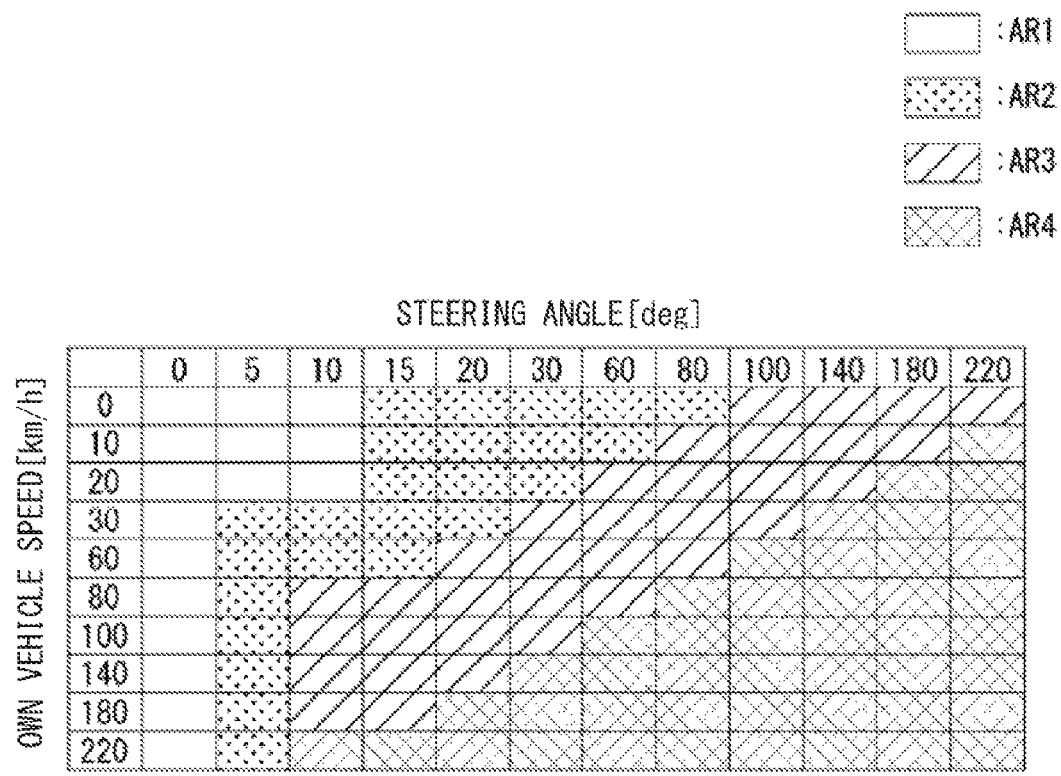

[ FIG. 12 ]
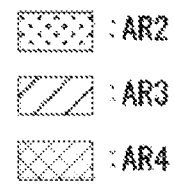

TRAVEL CONTROL APPARATUS

CROSS REFERENCE TO RELATED APPLICATION

The present application is a U.S. National Phase Application under 35 U.S.C. § 371 of International Patent Application No. PCT/JP2021/031934 filed Aug. 31, 2021. The entire contents of which are hereby incorporated by reference.

TECHNICAL FIELD

The present invention relates to a travel control apparatus to be mounted on a vehicle.

BACKGROUND

Japanese Unexamined Patent Application Publication No. 2009-126433 discloses a vehicle control apparatus that eliminates a need for an input operation to restart travel control such as following travel control after a right or left turn is made at an intersection.

SUMMARY OF INVENTION

Adaptive cruise control (ACC) includes control for calculating a target acceleration rate on the basis of a steering wheel angle and a vehicle speed assuming the presence of curves and intersections, in some cases. In this case, an acceleration rate is reduced in response to a steering operation performed after the vehicle enters a curve or an intersection. However, such acceleration rate control fails to sufficiently handle a case where the vehicle makes a turn having a substantially right angle, in particular, a case where the vehicle does not cross an oncoming lane while making a turn. Thus, the ACC needs to be cancelled in some cases, which results in inconvenience.

An object of the present invention is thus to achieve more appropriate acceleration rate control when a turn is to be made.

A travel control apparatus to be mounted on a vehicle according to one embodiment of the present invention includes a computer device configured to perform control to cause the own vehicle to travel at a set constant vehicle speed or to cause the vehicle to travel following the preceding vehicle. The computer device includes a determination unit and a target acceleration rate setting unit. The determination unit is configured to, before turn steering is started, determine whether it is a turn opportunity for the vehicle to make a first direction turn. The first direction turn is a turn made by the own vehicle deviating from a current travel course without crossing an oncoming travel course. The target acceleration rate setting unit is configured to, in a case where the determination unit determines that it is the turn opportunity, perform control to reduce acceleration before the turn steering is started.

According to the embodiment of the present invention, when a vehicle tries to make a turn in a first direction while ACC is used, acceleration is reduced before the turn is made. Therefore, it is possible to achieve stable turn traveling along an appropriate track at an intersection or another location while the ACC is maintained.

BRIEF DESCRIPTION OF DRAWINGS

FIG. 1 is an explanatory diagram of a vehicle including a vehicle control system according to one embodiment.

FIG. 2 is a block diagram of the vehicle control system according to one embodiment.

FIG. 3 is an explanatory diagram of an example of a second direction turn.

FIG. 4 is an explanatory diagram of an example of a curve.

FIG. 5 is an explanatory diagram illustrating an example of a first direction turn.

FIG. 6 is an explanatory diagram illustrating a case where the vehicle solely traveling under ACC makes the first direction.

FIG. 7 is an explanatory diagram illustrating a case where the vehicle traveling following a preceding vehicle under the ACC makes the first direction turn.

FIG. 8 is an explanatory diagram illustrating a case where the vehicle traveling following the preceding vehicle under the ACC makes the first direction turn when the preceding vehicle is lost.

FIG. 9 is a flowchart of a target acceleration rate setting process according to one embodiment.

FIG. 10 is a flowchart of a first direction turn determination process according to one embodiment.

FIG. 11 is an explanatory diagram of a second map according to one embodiment.

FIG. 12 is an explanatory diagram of a first map according to one embodiment.

DETAILED DESCRIPTION

Hereinafter, some embodiments of a travel control apparatus according to the present invention are described. The travel control apparatus is to be mounted in a vehicle and is an apparatus constituting a portion of a vehicle control system in the vehicle.

In the description and claims, the terms "first direction turn" and "second direction turn" are used. Turns made by vehicles at intersections or other locations are roughly classified into a right turn and a left turn. The first direction turn refers to a turn made by a vehicle deviating from a current travel course but not crossing an oncoming travel course, and the second direction turn refers to a turn made by a vehicle moving in a direction opposite to the first direction.

For example, in a country or a region, such as Japan, where vehicles should travel on the left side, the left turn corresponds to the first direction turn, and the right turn corresponds to the second direction. For example, in a country or a region, such as the United States of America, where vehicles should travel on the right side, the right turn corresponds to the first direction turn, and the left turn corresponds to the second direction turn.

The difference between the first direction turn and the second direction turn lies on which of a left turn signal and a right turn signal is to be turned on.

Further, the term "travel course" refers to the entirety of a left-side lane or the entirety of a right-side lane of a road. Note that the situation in which a turn signal lamp is turned on for making a lane change on a travel course with multiple lanes corresponds to neither the "first direction turn" nor the "second direction turn" in the description and claims.

FIG. 1 illustrates a vehicle 100 including a vehicle control system 1. The vehicle control system 1 is mounted on the vehicle 100 to perform traveling control of the vehicle 100.

Note that FIG. 1 schematically illustrates the vehicle control system 1 as one block; however, the vehicle control system 1 actually includes multiple pieces of hardware. As one piece of the hardware included in the vehicle control system 1, a travel control apparatus 2 according to the embodiment is provided.

FIG. 2 illustrates an example of the vehicle control system 1 to be mounted on the vehicle 100. The vehicle control system 1 includes the travel control apparatus 2. The travel control apparatus 2 includes a computer device that performs control to cause the vehicle 100 to travel at a set constant vehicle speed or to cause the vehicle 100 to travel following a preceding vehicle. For example, the travel control apparatus 2 automatically performs accelerator control, brake control, and other control that are known as ACC, which is one of driving assistance functions. Accordingly, in a case where there is a preceding vehicle, the travel control apparatus 2 causes the vehicle 100 to travel following the preceding vehicle with a constant intervehicle distance, and, in a case where there is no preceding vehicle, the travel control apparatus 2 causes the vehicle 100 to travel maintaining a constant speed set by the driver.

Note that the illustration in FIG. 2 focuses on main components relevant to the present invention out of the components included in the vehicle control system 1. The vehicle control system 1 may thus include other components that are not illustrated in FIG. 2. Alternatively, the vehicle control system 1 does not necessarily include all the components illustrated in FIG. 2.

The vehicle control system 1 includes the travel control apparatus 2, an outside environment recognition apparatus 3, a communicator 5, an engine controller 7, a transmission controller 8, a brake controller 9, a steering controller 10, an engine-related actuator 12, a transmission-related actuator 13, a brake-related actuator 14, a steering-related actuator 15, and a sensor-operator unit 16.

FIG. 2 illustrates a map locator 4, a GNSS receiver 21, which is, for example, a receiver for the global navigation satellite system (GNSS)), and a map database (DB) 22 in which high-definition map data is stored.

The vehicle control system 1 according to the present embodiment may have a configuration in which the map locator 4, the GNSS receiver 21, and the map DB 22 are not provided. Alternatively, the vehicle control system 1 may have a configuration in which at least the map locator 4 out of these components is not provided.

Note that the map locator 4 encompasses not only a locator in the narrow sense that is used to determine a traveling route or the like in automatic driving but also a navigation system or the like using the GNSS. That is, the map locator 4 refers to a device that is able to acquire information on a current position and intersections in the surroundings.

The travel control apparatus 2, the outside environment recognition apparatus 3, the communicator 5, the engine controller 7, the transmission controller 8, the brake controller 9, and the steering controller 10 are mutually coupled through a bus 17. In a case where the map locator 4 is mounted, the map locator 4 is also coupled to the bus 17.

The outside environment recognition apparatus 3 is an apparatus with a function of recognizing an outside environment of the vehicle 100 and acquiring outside environment information. For example, the outside environment recognition apparatus 3 includes a microcomputer including, for example, a central processing unit CPU, a read only memory (ROM), and a random access memory (RAM).

The outside environment recognition apparatus 3 includes a stereo camera 18, an image processing unit 19, a radar device 20, and other sensing devices. The stereo camera 18 is able to capture an image of a view in front of the vehicle 100. The image processing unit 19 performs various processing on an image received from the stereo camera 18. The radar device 20 is, for example, a millimeter-wave radar or a laser radar.

The stereo camera 18 includes a plurality of imaging units. The imaging units each include a camera optical system and an imaging device. The camera optical system forms an object image on an imaging surface of the imaging device, generating an electric signal per pixel in proportion to the amount of received light. Each of the imaging units is provided to achieve ranging by a so-called stereo imaging method. The electric signal generated at each of the imaging unit is subjected to A/D conversion or a predetermined correction process and supplied to the image processing unit 19 as a digital image signal (captured image data) indicating a luminance value per pixel based on a predetermined gray scale.

The image processing unit 19 includes a microcomputer including, for example, a CPU, a ROM, and a RAM. On the basis of the captured image data obtained by the imaging unit in, for example, the stereo camera 18, the image processing unit 19 executes predetermined image processing to recognize an environment outside the vehicle. The image processing at the image processing unit 19 is performed using a memory such as a non-volatile memory in the outside environment recognition apparatus 3.

The image processing unit 19 executes various image processing on the basis of the captured image data obtained by stereo imaging to recognize front environment information including data on a three-dimensional object and division lines (such as a center line and a lane diving line) present in front of an own vehicle. On the basis of the information recognized and other information, the image processing unit 19 detects the road or lane on which the own vehicle is traveling (own-vehicle traveling lane) and an object present on the own-vehicle traveling lane. For example, the image processing unit 19 detects a preceding vehicle traveling in front of the own vehicle, lane line data, sidewall data on guardrails, curbs, and other walls present along the road, three-dimensional object data on vehicles and other objects, stop lines, traffic lights, railroad crossings, crosswalks, and lanes. The image processing unit 19 may detect a vehicle traveling side by side with the own vehicle by adjusting the viewing angle, arrangement, or other parameters of the stereo camera 18.

The image processing unit 19 may also recognize an object present around the own vehicle and a behavior of the object on the basis of a captured image obtained by the stereo camera 18. For example, the image processing unit 19 may also recognize a speed, an acceleration rate (a positive or negative acceleration rate obtained by acceleration or deceleration), a change in a traveling direction, blinking of a turn signal lamp, or other behaviors of a preceding vehicle or a vehicle traveling side by side.

The image processing unit 19 calculates the various pieces of information on the surrounding environment described above per frame of the captured image data, for example, and stores the calculated information on a memory in sequence.

The travel control apparatus 2 includes a microcomputer including, for example, a CPU, a ROM, a RAM. The travel control apparatus 2 executes various traveling control processes for achieving driving assistance on the basis of information received from the outside environment recognition apparatus 3, the map locator 4, the communicator 5, or various sensors in the sensor-operator unit 16, or operation input information.

The travel control apparatus 2 is coupled to controllers including the engine controller 7, the transmission controller 8, the brake controller 9, and the steering controller 10 via the bus 17. Like the travel control apparatus 2, the engine controller 7, the transmission controller 8, the brake controller 9, and the steering controller 10 each include a microcomputer. The travel control apparatus 2 is able to perform mutual data communication with each of the controllers. The travel control apparatus 2 sends a command to any of the controllers described above as needed to cause the controller to execute an operation for driving assistance (driving assistance control).

Examples of the driving assistance control executed by the travel control apparatus 2 includes autonomous lane keeping control, autonomous emergency braking (AEB) control, adaptive cruise control (ACC), and autonomous lane changing control.

In the drawing, functions of a determination unit 2a and a target acceleration rate setting unit 2b are illustrated as functions of the travel control apparatus 2. These are some functions relevant to the ACC and are ones implemented by program modules.

The determination unit 2a determines whether it is a turn opportunity for the own vehicle to make the first direction turn, before turn steering is started. The first direction turn is a turn made by the own vehicle deviating from a current travel course without crossing an oncoming travel course.

In a case where the determination unit 2a determines that it is the turn opportunity, the target acceleration rate setting unit 2b performs control to reduce acceleration before the turn steering is started.

The communicator 5 is able to perform network communication, so-called vehicle to vehicle (V2V) communication, and road-to-vehicle communication. The travel control apparatus 2 is able to acquire various pieces of information received by the communicator 5. The communicator 5 is also able to acquire various pieces of information, such as surrounding environment information or road information, via network communication such as the Internet.

The sensor-operator unit 16 is illustrated as a comprehensive unit including various sensors and operators provided in the vehicle 100. Examples of the sensors in the sensor-operator unit 16 include a vehicle speed sensor 16a that detects a vehicle speed, an engine revolution sensor 16b that detects a revolution speed of the engine, an accelerator position sensor 16c that detects an accelerator position on the basis of the degree of depression of an accelerator pedal, a steering angle sensor 16d that detects a steering angle, a yaw rate sensor 16e that detects a yaw rate, and a brake switch 16f that is to be turned on or off in accordance with whether or not a brake pedal is operated.

Examples of the operators in the sensor-operator unit 16 include an ignition switch 16X for causing the engine to start or stop, an operation lever 16Y for a turn signal, and an operator 16Z for switching, for example, a driving mode as an operation relevant to the drive assistance control.

Note that these are mere examples, and other various sensors and operators are provided.

Various detection signals and operation signals from the sensor-operator unit 16 are supplied to the travel control apparatus 2, the engine controller 7, the transmission controller 8, the brake controller 9, the steering controller 10, and other components as needed.

On the basis of a detection signal received from a predetermined sensor in the sensor-operator unit 16 or operation input information received from a predetermined operator in the sensor-operator unit 16, for example, the engine controller 7 controls various actuators each provided as the engine-related actuator 12.

As the engine-related actuator 12, various actuators such as a throttle actuator that drives a throttle valve and an injector that injects fuel are provided.

On the basis of a detection signal received from a predetermined sensor in the sensor-operator unit 16 or operation input information received from a predetermined operator in the sensor-operator unit 16, the transmission controller 8 controls various actuators each provided as the transmission-related actuator 13.

As the transmission-related actuator 13, for example, an actuator for speed-change control of an automatic transmission is provided.

On the basis of a detection signal received from a predetermined sensor in the sensor-operator unit 16 or operation input information received from a predetermined operator in the sensor-operator unit 16, the brake controller 9 controls various actuators each provided as the brake-related actuator 14.

As the brake-related actuator 14, various engine-related actuators, such as a hydraulic control actuator that controls the pressure of a fluid outputted from a brake booster to a master cylinder and the hydraulic pressure inside a brake fluid pipe, are provided.

The steering controller 10 calculates a necessary steering torque on the basis of a target steering angle received from, for example, the travel control apparatus 2 to control the steering-related actuator 15. The steering controller 10 thereby achieves automatic steering as needed.

The map locator 4 is able to identify a current position of the vehicle 100 with high accuracy using the GNSS receiver 21 and the map DB 22. For example, the map locator 4 is able to identify not only a road on which the vehicle 100 is traveling but also a traveling lane on the vehicle 100 is traveling.

According to the present embodiment, the first direction turn is able to be stably made while the ACC function is executed by the travel control apparatus 2.

In particular, the first direction turn is stably achieved even in a case where the vehicle 100 does not include the map locator 4. Further, in a case where the vehicle 100 includes the map locator 4, the first direction turn is stably achieved even when the accuracy of the map locator 4 lowers.

Various turn situations are exemplified in FIGS. 3, 4, and 5. These examples are ones in a country or a region where vehicles should travel on the left side. In each of these examples, the vehicle 100 traveling on a travel course 300 makes a turn with a steering operation.

FIG. 3 illustrates a right turn corresponding to the second direction turn. In this example, the vehicle 100, which is the own vehicle, deviates from the current travel course 300 to make a turn crossing the oncoming vehicle travel course 301.

FIG. 4 illustrates an example of a left curve of the travel course 300. In this example, the vehicle 100, which is the own vehicle, makes a turn with a steering operation but without deviating from the travel course 300.

FIG. 5 illustrates a left turn corresponding to the first direction turn. In this example, the vehicle 100, which is the own vehicle, deviates from the current travel course 300 to make a turn without crossing the oncoming vehicle travel course 301.

In the present embodiment, the description focuses particularly on the first direction turn illustrated in FIG. 5.

Although the first direction turn is made at an intersection in the example illustrated in FIG. 5, locations where the first direction turn is made is not limited to intersections. For example, the first direction turn encompasses a turn to enter a road-side store, a parking lot, or a garage.

A reason why the description focuses on the first direction turn is as follows.

For example, in a case where the vehicle 100 tries to make a right or left turn at an intersection while the ACC is used, the vehicle 100 may fail to complete making the turn due to a high acceleration rate. Thus, it is preferable to perform acceleration rate reducing control based on a steering angle and a vehicle speed in the case of making a right or left turn.

However, if the acceleration rate reducing control is performed after steering for a right or left turn is started, the vehicle 100 may fail to complete making the right or left turn in some cases in a scene in which the vehicle 100 should make a substantially right angle turn, such as the first direction turn. Thus, according to the present embodiment, in the case of making the first direction turn, the acceleration rate is able to be reduced before steering at, for example, an intersection is started, i.e., while the vehicle 100 is traveling straight.

Further, the acceleration rate is able to be reduced in accordance with the steering angle upon the first direction turn by acquiring information on, for example, the location of an intersection by the map locator 4, estimating the presence of the intersection on the basis of the information, and estimating the occurrence of the first direction turn. However, the vehicle 100 that does not include the map locator 4 or the like is not able to perform such an operation.

Even in a case where the vehicle 100 includes the map locator 4, the vehicle 100 may fail to acquire accurate information in some cases due to a decrease in accuracy of the map locator 4 in a country or a region, high-rise areas, sections under construction, newly constructed roads, or other locations where road map information is not obtainable.

Thus, according to the present embodiment, the first direction turn is able to be stably performed while the ACC is used regardless of whether the vehicle 100 includes the map locator 4 or the like or even in a case where the accuracy of the map locator or the like lower.

In the scene in which the vehicle 100 makes the second direction turn or a turn along a curve, the track of the vehicle 100 at the time of making the turn has a moderate curve. Thus, a stable turn is able to be made even when the acceleration rate reducing control is executed after steering is started. For this reason, the case where the acceleration rate reducing control is performed before steering for making the first direction turn is started is applied.

From these perspectives, scenes illustrated in FIGS. 6, 7, and 8 are assumed for the first direction turn in the present embodiment.

FIG. 6 illustrates a scene in which the vehicle 100 solely travels under the ACC at an intersection from a timing t1 to a timing t2. For example, at the timing t1, the vehicle 100 stops before a stopping line for a red traffic signal at the intersection. Thereafter, at the timing t2, the vehicle 100 starts advancing following a green traffic signal and makes the first direction turn.

FIG. 7 illustrates a scene in which the vehicle 100 travels under the ACC following a preceding vehicle from a timing t11 to a timing t12. For example, at the timing t11, the vehicle 100 or the own vehicle traveling following the preceding vehicle 200 stops before a stopping line for a red traffic signal at the intersection.

Thereafter, at the timing t12, the preceding vehicle 200 starts advancing straight, whereas the vehicle 100 starts traveling under the ACC makes the first direction turn. In this scene, the vehicle 100 traveling following the preceding vehicle 200 under the ACC is prevented from being over-accelerated, in order to make the first direction turn.

FIG. 8 illustrates a scene in which the preceding vehicle is lost while the vehicle 100 travels following the preceding vehicle under the ACC from a timing t21 to a timing t22. The phrase "the preceding vehicle is lost" refers to a state in which the preceding vehicle 200 is no longer detected. As illustrated in FIG. 8, at the timing t21, the vehicle 100 or the own vehicle stops before a stopping line for a red traffic signal at an intersection, following the preceding vehicle 200. Thereafter, at the timing t22, the preceding vehicle 200 makes the first direction turn, and the vehicle 100 also makes the first direction turn after starting traveling under the ACC. In the middle of the turn, the preceding vehicle 200 is lost in some cases. In a case where the preceding vehicle 200 is no longer detected, the vehicle 100 is generally accelerated through the ACC process assuming that no preceding vehicle is present. In such a case, the acceleration rate is reduced to allow the first direction turn to be stably made.

Each of the scenes illustrated in FIGS. 6, 7, and 8, the vehicle 100 starts traveling and makes the first direction turn after stopping at the intersection; however, these scenes are mere examples.

For example, in another case where the vehicle 100 enters the intersection at a low speed while the green traffic signal is turned on and then makes the first direction turn, the three scenes illustrated in FIGS. 6, 7, and 8 are assumable: the scene in which the vehicle 100 solely travels under the ACC, the scene in which the vehicle 100 travels following a preceding vehicle, and the scene in which a preceding vehicle is lost while the vehicle 100 travels under the ACC. In still another case where the vehicle 100 reduces its speed and then makes the first direction turn to enter a place other than the intersection such as a shop or a parking lot along a road, the three scenes illustrated in FIGS. 6, 7, and 8 are assumable: the case where the vehicle solely travels under the ACC, the case where the vehicle 100 travels following a preceding vehicle, and the case where a preceding vehicle is lost while the vehicle 100 travels under the ACC.

The control according to the present embodiment described below is preferably applied to any of these scenes. The control according to the present embodiment described below is applicable to scenes other than these scenes. In particular, the control according to the present embodiment is applicable to a scene in which the vehicle 100 reduces its speed before making a turn and then makes a substantially right angle turn.

However, the control according to the present embodiment is not applied to a scene in which the vehicle 100 enters, for example, an intersection at a high own vehicle speed before making a turn. For example, in a scene in which the vehicle 100 enters the intersection at a high own vehicle speed, it is essential to acquire the information on the position of the intersection by the map locator 4 or the like. Accordingly, the case is out of the range to which the control according to the present embodiment is applicable.

A specific example of a process performed by the travel control apparatus 2 will now be described.

In the example of the process, it is determined whether the first direction turn is to be made using a calculation method for calculating a target acceleration rate on the basis of a vehicle speed and a steering angle corrected with a steering angular speed. In a case where it is determined that the first direction turn is to be made, the acceleration rate is reduced before steering is started, and the target acceleration rate is calculated to cause the vehicle 100 to travel at a vehicle speed appropriate to make the first direction turn.

FIG. 9 illustrates an example of a target acceleration rate calculation process performed by the travel control apparatus 2. The target acceleration rate calculation process is executed while the travel control apparatus 2 is performing the ACC process, and is a process implemented by the functions of the determination unit 2a and the target acceleration rate setting unit 2b illustrated in FIG. 2.

The travel control apparatus 2 executes the process illustrated in FIG. 9 at every predetermined time, for example.

The process to be performed by the travel control apparatus 2 is divided on the basis of a determination in Step S101 as to whether the vehicle 100 or the own vehicle includes the map locator 4.

In a case where the own vehicle includes the map locator 4, the travel control apparatus 2 proceeds to Step S102 in which it is determined whether a current status of the map locator 4 is an on-state. That is, it is determined whether the map locator 4 is working.

In a case where the map locator 4 is working, the travel control apparatus 2 assesses the accuracy of the map locator 4 in Step S103. For example, the travel control apparatus 2 assesses the current accuracy of the map locator 4 by comparing the information obtained by the map locator 4 with the information obtained by the outside environment recognition apparatus 3.

Specifically, for example, the accuracy of the map locator 4 is assessed to be favorable in a case where an intersection located in front is acquired as the information obtained by the map locator, an intersection located in front is acquired as the information obtained by the outside environment recognition apparatus 3 on the basis of the stereo camera 18, and a traffic light located in front is also detected as the information obtained by the outside environment recognition apparatus 3.

In contrast, the accuracy of the map locator 4 is assessed to be unfavorable in a case where a straight road located in front is acquired as the information obtained by the map locator 4, an intersection located in front is detected as the information obtained by the outside environment recognition apparatus 3 on the basis of the stereo camera 18, and a traffic light located in front is detected as the information obtained by the outside environment recognition apparatus 3.

As described above, the accuracy of the map locator 4 is assessed on the basis of whether the information obtained by the map locator 4 is contradictory to the information obtained by the outside environment recognition apparatus 3.

In a case where the accuracy of the map locator 4 is favorable, the travel control apparatus 2 proceeds from Step S104 to Step S105 in which the target acceleration rate is calculated on the basis of the information obtained by the map locator 4.

In contrast, in a case where the vehicle 100 does not include the map locator 4, or in a case where the vehicle 100 includes the map locator 4 but the status of the map locator 4 is not the on-state (i.e., the map locator 4 is not working), or in a case where the map locator 4 is working but the accuracy of the map locator 4 is assessed to be unfavorable, the travel control apparatus 2 proceeds from Step S101, Step S102, or Step S104 to Step S120.

In Step S120, the travel control apparatus 2 performs a first direction turn determination, i.e., determines whether it is a turn opportunity appropriate to make the first direction turn. An example process of the first direction turn determination is illustrated in FIG. 10.

In Step S201 in FIG. 10, the travel control apparatus 2 determines whether a turn signal lamp of the own vehicle for the first direction turn is ON. For example, in a case where the first direction turn is a left turn, it is determined whether the turn signal for the left turn is blinking. The determination as to whether the turn signal is blinking may be made by confirming a turn-signal control signal regarding an unillustrated turn signal lamp.

In Step S202, it is determined whether the turn signal lamp for the first direction turn was OFF in the previous detection. The fact that the turn signal lamp for the first direction turn was OFF in the previous process illustrated in FIG. 9 means that the turn signal lamp has just started blinking in the present detection. In such a case, the travel control apparatus 2 proceeds to Step S203. That is, the process proceeds to Step S203 when the turn signal starts blinking in response to an operation performed by, for example, an occupant or under automatic control.

In Step S203, the travel control apparatus 2 detects a current own vehicle speed and determines whether the current own vehicle speed is less than a predetermined threshold speed SP1. The threshold speed SP1 is a speed with which it is possible to determine whether a turn is able to be made at a low speed. For example, the threshold speed SP1 is about 20 km/h to 25 km/h.

In a case where the own vehicle speed is less than the threshold speed SP1, the travel control apparatus 2 proceeds to Step S204 in which a determination flag for the first direction turn is ON.

In a case where the turn signal lamp for the first direction turn is not ON, or in a case where the turn signal lamp has been blinking since the last time when the turn signal lamp started blinking, or in a case where the own vehicle speed is greater than or equal to the threshold speed SP1, the travel control apparatus 2 proceeds to Step S210. In Step S210, the travel control apparatus 2 determines whether it is a timing after the completion of the first direction turn. For example, the travel control apparatus 2 determines whether it is a timing when the vehicle 100 has completed the turn and starts advancing straight.

The travel control apparatus 2 is able to determine that the first direction turn has been completed by, for example, detecting the fact that the steering angle has been returned to a straight traveling state or that the turn signal lamp has stopped blinking, or confirming information received from the outside environment recognition apparatus 3.

In a case where it is determined that the first direction turn has been completed, the travel control apparatus 2 turns off the determination flag for the first direction turn in Step S211.

The first direction turn determination described above with reference to FIG. 10 is performed in Step S120 of FIG. 9. Accordingly, the travel control apparatus 2 keeps the determination flag ON from the timing when the turn signal lamp starts blinking while the vehicle 100 is traveling at a relatively low speed (including a case where the vehicle is stopped), i.e., the timing when steering for making the first direction turn is started to the timing when it is determined that the first direction turn has been completed.

The process to be performed by the travel control apparatus 2 is divided at Step S121 of FIG. 9 depending on the determination flag. Accordingly, the process in FIG. 9 that is repeatedly executed proceeds to Steps S122 and S123 while the determination flag is ON, i.e., during the period from the timing when the turn signal starts blinking before the first direction turn is made to the timing when the first direction turn is completed. In the other period, the process in FIG. 9 proceeds to Steps S124 and S125.

In the case where the determination flag is OFF, the travel control apparatus 2 calculates the target acceleration rate through Steps S124 and S125.

In Step S124, the travel control apparatus 2 calculates a steering angle correction value based on a steering angular speed. In this process, a steering angle used to set the target acceleration rate is greater than an actual steering angle as the steering angular speed increases.

Specifically, an absolute value of the steering angle is differentiated with respect to time to calculate the steering angular speed. Thereafter, a corrected steering angle is calculated on the basis of the own vehicle speed and the steering angular speed. It is preferable that the acceleration rate be further reduced as the steering angular speed and the own vehicle speed increase. Thus, in Step S124, in preparation for the next Step S125, the steering angle correction value is so calculated that the steering angle is determined to be greater as the steering angular speed and the speed increase.

In Step S125, the travel control apparatus 2 calculates the target acceleration rate using a second map illustrated in FIG. 11. The map is referred to as "second map" in the description to differentiate the map from a first map illustrated in FIG. 12 described below.

The second map illustrated in FIG. 11 has a horizontal axis representing a steering angle [deg] and a vertical axis representing an own vehicle speed [km/h].

In this example, regions defined by steering angles and own vehicle speeds are categorized into regions AR1, AR2, AR3, and AR4. The second map is map data that includes these regions AR1, AR2, AR3, and AR4 each storing a corresponding acceleration rate reduction level.

The region AR1 stores a value representing no acceleration rate reduction. The region AR2 stores a value representing an acceleration rate reduction at a low level. The region AR3 stores a value representing an acceleration rate reduction at a middle level. The region AR4 stores a value representing an acceleration rate reduction at a high level.

Using such a second map, the travel control apparatus 2 refers to the corrected value of the steering angle along the horizontal axis, and refers to a current vehicle speed along the vertical axis to determine a corresponding region, and calculates the target acceleration rate on the basis of the value of the corresponding region.

Accordingly, the degree of the acceleration rate reduction increases as the steering angle or the own vehicle speed increases. Thus, the target acceleration rate at the time of the ACC process is controlled to vary depending on situations. For example, the acceleration rate is reduced when the vehicle 100 travels along a curve or when the vehicle 100 makes the second direction turn. Note that the acceleration rate reduction is performed after steering is started. In a case where the steering angle is "0", the acceleration rate reduction is not performed with reference to the value in the region AR1.

In contrast, in a case where the determination flag is ON in Step S121 of FIG. 9, the travel control apparatus 2 calculates the target acceleration rate through the processes in Steps S122 and S123.

As in Step S124 described above, the travel control apparatus 2 calculates a steering angle correction value on the basis of the steering angular speed in Step S122.

However, at the first point in time when the determination flag is turned on, it is assumed that the first direction turn has not been made yet and steering has not been started yet. Accordingly, the steering angular speed is zero, and thus substantially no correction of the steering angle is performed.

Thereafter, in Step S123, the travel control apparatus 2 calculates the target acceleration rate using the first map illustrated in FIG. 12.

Like the second map described above, the first map has a horizontal axis representing a steering angle [deg] and a vertical axis representing an own vehicle speed [km/h]. In this example, regions defined by steering angles and own vehicle speeds are categorized into regions AR2, AR3, and AR4. The first map is, for example, map data that includes these regions AR2, AR3, and AR4 each storing a corresponding acceleration rate reduction level, like the regions AR2, AR3, and AR4 of the second map. For the first map, a region to be referred does not substantially change depending on the steering angle. That is, reference is made to any of the regions AR2, AR3, and AR4 depending on the own vehicle speed. Further, as the first map does not include the region AR1, the acceleration rate reduction in accordance with a speed is performed before steering is started.

Using such a first map, the travel control apparatus 2 refers to a current own vehicle speed along the vertical axis to determine a corresponding region, and calculates the target acceleration rate on the basis of the value of the corresponding region.

Accordingly, acceleration is reduced by the ACC at the timing when it is determined that the first direction turn is to be made, e.g., while the vehicle 100 is traveling straight before steering is started. While the vehicle 100 is making a turn, the acceleration rate is reduced in accordance with the own vehicle speed at that time.

Note that, in the example using the first map illustrated in FIG. 12, the acceleration rate reduction level does not vary depending on the steering angle. Thus, the process in Step S122 may be omitted.

Further, it is possible to reduce the storage capacity by providing the first map illustrated in FIG. 12 as uniaxial map data depending on the own vehicle speed. In this case, steering angle correction may be performed in Step S122 assuming that the steering angle to be referred to is 0 degrees, for example.

In another example in which the first map is used, the acceleration rate reduction level may vary also depending on the steering angle. In this case, the steering angle correction value may be calculated in Step S122 as in Step S124.

Also in the case where the acceleration rate reduction level in the first map varies depending on both of the own vehicle speed and the steering angle, the acceleration rate reduction level in the first map is higher than that in the second map at the same steering angle and the same own vehicle speed.

In a case where the vehicle 100 does not include the map locator 4, the travel control apparatus 2 does not need to perform Steps S101 to S105 in FIG. 9. This allows the acceleration rate reduction control regarding the first direction turn to be performed with a simple program.

However, using the program including Steps S101 to S105 as illustrated in FIG. 9, it is possible to achieve the travel control apparatus 2 for versatile use regardless of whether or not the vehicle 100 includes the map locator 4. Further, even in a case where the map locator 4 is retrofitted to the vehicle 100, both of the acceleration rate reduction control by the map locator 4 and the acceleration rate reduction control in a case where the accuracy of the map locator 4 is low are executable.

According to the embodiment described above, the following effects are obtained.

The travel control apparatus 2 according to the embodiment includes a computer device that causes the vehicle 100 or the own vehicle to travel at a set constant vehicle speed or causes the vehicle 100 to travel following the preceding vehicle 200. The travel control apparatus 2 further includes the determination unit 2a that determines whether it is the turn opportunity to make the first direction turn, which is a turn made by the own vehicle deviating from the current travel course 300 without crossing the oncoming vehicle travel course 301, before steering for the turn is started. The travel control apparatus 2 further includes the target acceleration rate setting unit 2b. In the case where the determination unit 2a determines that it is the turn opportunity, the target acceleration rate setting unit 2b performs control to reduce the acceleration rate before steering for the turn is started.

In the case of the second direction turn or a curve, the track of the vehicle 100 making a turn is relatively moderate. Thus, reducing the acceleration before steering starts is unlikely to cause unstable traveling of the vehicle 100. However, in the case of the first direction turn, which is a turn made by the vehicle 100 without crossing the oncoming vehicle travel course 301, the vehicle 100 has to make a substantially right angle turn in many cases. In this case, the acceleration is reduced before a turn is made, e.g., before the vehicle 100 makes a turn in the first direction with the ACC being used. Accordingly, it is possible to make a stable turn along an appropriate track at an intersection while the ACC is maintained. This also means that it is possible to achieve turn traveling that makes the occupant feel safe.

Note that the control described above is useful, in particular, for a situation where the vehicle 100 has a difficulty in making a turn under the acceleration rate reduction control which is executed after steering is started, and a situation where the track of the vehicle 100 making the first direction turn is assumed to largely deviate. However, the control may be applied also to a situation where the vehicle 100 makes the second direction turn at a substantially right angle at an intersection with a narrow road width.

In the embodiment, the determination unit 2a determines that the first direction turn will be made in a case where the turn signal for the first direction turn is detected to be ON and where the own vehicle speed is less than the predetermined threshold speed SP1 (see FIG. 10). Note that the phrase "the turn signal is ON" refers to the state in which the turn signal lamp is detected to be turned on. For example, the phrase "the turn signal is ON" refers to the state in which the turn signal lamp is detected to be blinking for direction indication on the basis of an operation signal generated in response to a driver's operation on an operation lever 16Y or a blinking activation signal for the turn signal lamp based on the operation signal.

In a case where the own vehicle speed is less than the threshold speed SP1 while the turn signal for the first direction turn is ON, it is estimated that the first direction turn will be made at, for example, an intersection. At least, it is estimated that a turn in the first direction at a relatively sharp angle (a substantially right angle turn) will be made at a high possibility. Thus, it is a situation appropriate to reduce the acceleration rate before steering for the turn is started. Performing the acceleration rate reduction control on the basis of the determination described above makes it possible to achieve appropriate turn traveling even while the ACC is used.

The control is effective not only for the first direction turn at an intersection but also for a turn to enter a shop, a parking lot, or a garage along a road, for example. Also in a case where the first direction turn is made at such a location other than an intersection, the turn signal is ON. Thus, it is possible to appropriately achieve the function according to the embodiment.

Further, even in a case where the vehicle 100 includes no locator, it is possible to easily and appropriately determine whether the first direction turn will be made at the intersection. This achieves the first direction turn that makes the driver feel safe.

Moreover, since the determination is made on the basis of the state of the turn signal and the own vehicle speed, it is possible to determine whether it is the turn opportunity by an independent function of only the own vehicle. This means that it is possible to achieve a safe first direction turn at an intersection.

In the example described in the embodiment, in a case where it is determined that it is the turn opportunity, the target acceleration rate setting unit 2b calculates the target acceleration rate by the first calculation method on the basis of at least the own vehicle speed. In contrast, in a case where it is determined that it is not the turn opportunity, the target acceleration rate setting unit 2b calculates the target acceleration rate by the second calculation method on the basis of the steering angle and the own vehicle speed.

For example, in the embodiment, in a case where the first direction turn is determined, the target acceleration rate is calculated by the first calculation method using the first map. In contrast, in a case where the first direction turn is not determined, the target acceleration rate is calculated by the second calculation method using the second map (see Steps S123 and S125 of FIG. 9).

Accordingly, it is possible to reduce the acceleration rate in accordance with the first direction turn.

In the calculation of the target acceleration rate described above, the target acceleration rate is set by different calculation methods between the case of the first direction turn and the case of the second direction turn. Accordingly, it is possible to achieve acceleration rate control appropriate for each of a left turn and a right turn.

To achieve the calculation of the target acceleration rate by the first and second calculation methods, not only the first map and the second map but also a first arithmetic expression corresponding to the first map and a second arithmetic expression corresponding the second map may be stored, and the target acceleration rate may be calculated through arithmetic processing based on them.

In the embodiment, the case where the vehicle 100 includes the map locator 4 is described. For example, the determination unit 2a of the travel control apparatus 2 assesses the accuracy of the map locator 4. In a case where the determination unit 2a assesses the accuracy to be unfavorable, the determination unit 2a determines that it is the turn opportunity to make the first direction turn when the turn signal is detected to be ON and the own vehicle speed is less than the predetermined threshold (see Steps S103, S104, and S120 of FIG. 9).

In the case where the vehicle 100 includes the map locator 4, the target acceleration rate is able to be set by determining the track of the vehicle 100 at the time of making the turn on the basis of information acquired by the map locator 4. However, in a situation where the accuracy of the map locator 4 is low, it is not appropriate to calculate the target acceleration rate for the first direction turn on the basis of the information. Thus, as in the case where the vehicle 100 does not include the map locator 4, whether it is the turn opportunity is determined on the basis of both of the state of the turn signal and the own vehicle speed. Accordingly, it is possible to achieve stable turn traveling that makes the occupant to feel safe even in the case where the accuracy of the map locator 4 is lowered.

It is to be noted that the embodiments described above are mere examples of the embodiments of the present invention, and the embodiments of the present invention should not be limited the examples described above. Thus, various modification examples are conceivable.

The program causing the computer device to execute the processes described in FIGS. 9 and 10 may be stored in a storage medium such as a non-volatile memory in the travel control apparatus 2 or a non-volatile memory in the vehicle control system 1. Alternatively, the program may be stored in a portable storage medium or may be downloaded from a server apparatus via network communication to the vehicle 100.

The invention claimed is:

1. A travel control apparatus to be mounted on a vehicle comprising a map locator, the travel control apparatus comprising:
    a computer device configured to perform control to cause the vehicle to travel at a set constant vehicle speed or to cause the vehicle to travel following a preceding vehicle, wherein,
    the computer device comprises a program stored in a storage medium, the program being executable to cause the computer device to:
        determine, before turn steering is started, whether it is a turn opportunity for the vehicle to make a first direction turn, the first direction turn being a turn made by the vehicle deviating from a current travel course without crossing an oncoming travel course,
        assess accuracy of the map locator,
        upon assessing the accuracy to be unfavorable, determine that it is the turn opportunity in a case where a turn signal for the first direction turn is detected to be ON and a vehicle speed of the vehicle is less than a predetermined threshold, and
        in a case where it is determined that it is the turn opportunity, perform control to reduce acceleration before the turn steering is started.

2. The travel control apparatus according to claim 1, wherein
    the program is executable to cause the computer device to:
    calculate a target acceleration rate by a first calculation method on a basis of at least a vehicle speed of the vehicle in a case where it is determined that it is the turn opportunity, and
    calculate the target acceleration rate by a second calculation method on a basis of a steering angle and the vehicle speed in a case where it is not determined that it is the turn opportunity.

3. A travel control apparatus to be mounted on a vehicle comprising a map locator, the travel control apparatus comprising:
    a computer device configured to perform control to cause the vehicle to travel at a set constant vehicle speed or to cause the vehicle to travel following a preceding vehicle, wherein,
    the computer device comprises a program stored in a storage medium, the program being executable to cause the computer device to:
        determine, before turn steering is started, whether it is a turn opportunity for the vehicle to make a first direction turn, the first direction turn being a turn made by the vehicle deviating from a current travel course without crossing an oncoming travel course,
        assess accuracy of the map locator, and
        upon assessing the accuracy to be unfavorable, determine that it is the turn opportunity in a case where a turn signal for the first direction turn is detected to be ON and a vehicle speed of the vehicle is less than a predetermined threshold.

* * * * *